United States Patent
Webb

(10) Patent No.: US 9,860,240 B2
(45) Date of Patent: *Jan. 2, 2018

(54) MULTI-RING ENCRYPTION APPROACH TO SECURING A PAYLOAD USING HARDWARE MODULES

(71) Applicant: McAfee, Inc., Santa Clara, CA (US)

(72) Inventor: David Webb, Seaford (GB)

(73) Assignee: McAfee, LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/087,541

(22) Filed: Mar. 31, 2016

(65) Prior Publication Data
US 2017/0085551 A1    Mar. 23, 2017

Related U.S. Application Data

(63) Continuation of application No. 13/838,441, filed on Mar. 15, 2013, now Pat. No. 9,305,172.

(51) Int. Cl.
*G06F 12/14* (2006.01)
*H04L 9/32* (2006.01)
(Continued)

(52) U.S. Cl.
CPC .......... *H04L 63/083* (2013.01); *G06F 21/602* (2013.01); *G06F 21/74* (2013.01);
(Continued)

(58) Field of Classification Search
CPC . H04L 63/083; H04L 63/0428; H04L 63/061; H04L 9/0863; H04L 9/0891;
(Continued)

(56) References Cited

U.S. PATENT DOCUMENTS 4,386,266 A    5/1983    Chesarek
5,937,066 A    8/1999    Gennaro et al.
(Continued)

FOREIGN PATENT DOCUMENTS

WO    02/01271 A2    1/2002

OTHER PUBLICATIONS

Schneier, Bruce "Applied Cryptography: Protocols, Algorithms, and Source Code in C", Second Edition, Wiley and sons, pp. 173 a 455, 1996.
(Continued)

*Primary Examiner* — Michael Simitoski
(74) *Attorney, Agent, or Firm* — Blank Rome, LLP

(57) ABSTRACT

Disclosed are systems and methods of employing a multi-ring encryption approach to secure a data payload. Each ring of encryption may be encrypted from a key derived from a password, such that each subsequent ring of protection is protected by a key derived from the key used to encrypt the previous ring of protection. Further, hardware-based encryption may be employed in one or more of the rings of protection to bind the encrypted payload to the hardware. Such systems and methods may be used to reduce the ability to parallelize an attack on encrypted data while also permitting password-related data to be synchronized across a network.

18 Claims, 10 Drawing Sheets

(51) Int. Cl.
*H04L 9/14* (2006.01)
*H04L 29/06* (2006.01)
*G06F 21/60* (2013.01)
*H04L 9/08* (2006.01)
*G06F 21/76* (2013.01)
*G06F 21/74* (2013.01)

(52) U.S. Cl.
CPC .............. *G06F 21/76* (2013.01); *H04L 9/088* (2013.01); *H04L 9/0863* (2013.01); *H04L 9/0877* (2013.01); *H04L 9/14* (2013.01); *H04L 9/3234* (2013.01); *H04L 63/061* (2013.01)

(58) Field of Classification Search
CPC ... H04L 9/0897; H04L 9/3234; G06F 21/602; G06F 21/41; G06F 21/53; G06F 21/57; G06F 21/6209; G06F 2221/2107; G06F 12/1466
See application file for complete search history.

(56) References Cited

U.S. PATENT DOCUMENTS

| | | | |
|---|---|---|---|
| 6,081,893 A | 6/2000 | Grawrock et al. | |
| 6,366,117 B1 | 4/2002 | Pang et al. | |
| 6,446,092 B1 | 9/2002 | Sutter | |
| 6,947,556 B1 | 9/2005 | Matyas et al. | |
| 6,985,583 B1 | 1/2006 | Brainard et al. | |
| 7,225,339 B2 | 5/2007 | Asano et al. | |
| 7,600,134 B2 | 10/2009 | Catherman et al. | |
| 7,802,096 B1 | 9/2010 | Matthews et al. | |
| 7,814,317 B1 | 10/2010 | Matthews et al. | |
| 7,873,166 B2 * | 1/2011 | Robinson | H04L 9/0662 380/277 |
| 7,936,873 B2 * | 5/2011 | Farrugia | H04L 63/0457 380/37 |
| 8,024,810 B2 * | 9/2011 | Saito | G11B 20/00086 380/259 |
| 3,059,814 A1 | 11/2011 | Duane | |
| 8,233,621 B2 * | 7/2012 | Li | H04N 7/1675 375/240.16 |
| 2002/0025042 A1 | 2/2002 | Saito | |
| 2003/0206511 A1 | 11/2003 | Kobayashi et al. | |
| 2003/0210791 A1 | 11/2003 | Binder | |
| 2004/0019795 A1 | 1/2004 | Okaue | |
| 2004/0196972 A1 | 10/2004 | Zhu et al. | |
| 2005/0036612 A1 | 2/2005 | Shiina | |
| 2005/0177713 A1 | 8/2005 | Sim | |
| 2006/0020824 A1 | 1/2006 | Matthews et al. | |
| 2007/0130472 A1 * | 6/2007 | Buer | H04L 63/0428 713/182 |
| 2007/0140489 A1 * | 6/2007 | Dharmarajan | H04L 9/0866 380/228 |
| 2007/0168048 A1 | 7/2007 | Allen et al. | |
| 2007/0214369 A1 * | 9/2007 | Roberts | G06F 21/79 713/192 |
| 2008/0037785 A1 | 2/2008 | Gantman et al. | |
| 2008/0059804 A1 * | 3/2008 | Shah | G06F 21/41 713/186 |
| 2008/0077809 A1 * | 3/2008 | Hayler | G06F 12/1466 713/193 |
| 2008/0273704 A1 | 11/2008 | Norrman et al. | |
| 2008/0310619 A1 * | 12/2008 | Scheidt | H04L 9/085 380/28 |
| 2009/0110191 A1 | 4/2009 | Sanvido et al. | |
| 2009/0168994 A1 | 7/2009 | Heuss | |
| 2009/0222658 A1 | 9/2009 | Sandhu et al. | |
| 2010/0122086 A1 * | 5/2010 | Cuellar | G06F 21/10 713/167 |
| 2010/0268960 A1 | 10/2010 | Moffat et al. | |
| 2011/0004758 A1 | 1/2011 | Walker et al. | |
| 2011/0202765 A1 * | 8/2011 | McGrane | G06F 21/53 713/168 |
| 2011/0252243 A1 * | 10/2011 | Brouwer | H04L 9/0838 713/189 |
| 2012/0093319 A1 * | 4/2012 | Saito | G11B 20/00086 380/278 |
| 2014/0169554 A1 * | 6/2014 | Scarisbrick | H04L 9/0863 380/28 |

OTHER PUBLICATIONS

International Search Report and Written Opinion received for PCT Patent Application No. PCT/US2014/020983, dated Jun. 16, 2014, 13 pages.

* cited by examiner

MULTI-RING ENCRYPTION APPROACH TO SECURING A PAYLOAD USING HARDWARE MODULES

TECHNICAL FIELD

This disclosure relates generally to a system and method for securing a payload of data with multiple rings of hardware-enforced security, where each hardware-enforced ring can be successively encrypted from keys derived from the same password. More particularly, but not by way of limitation, this disclosure relates to methods and systems to permit synchronization of passwords and data across a network without requiring transmission of the password.

BACKGROUND

Encryption is often used to protect data both in storage and in transmission. To enable encryption, an encryption key is needed to be able to convert plaintext data, or unencrypted data, into encrypted data. The encryption key may be any sequence of bits that satisfies the encryption key length requirement. When an entire disk on a computer is to be encrypted, it may be convenient to use a user-generated password as an encryption key to be able to individualize the encryption process. For fast performance, disk encryption typically employs symmetric encryption, which refers to the fact that the same key that is used to encrypt data may also be used to decrypt data. However, because users may often use "dictionary" terms as passwords, there is an inherent risk that a simple user password encryption key could be easily cracked. Accordingly, a mechanism known as password-based encryption, or PBE, can be utilized to develop stronger encryption keys. With PBE, a user's password is not directly used as the encryption key. Instead, the user's password is converted using a key derivation function, such as a hashing algorithm, to create a hashed password. Key derivation functions are typically one-way functions that may not be reversed to arrive at the input (i.e., key derivation functions have no inverse), and often also require a salt as input which allows for the same password to create different keys with different values of salt. The hashed password may then be used as the encryption key to encrypt data. Additionally, a key derivation function allows for different length user passwords to be converted into the required length for an encryption key. However, with this approach, any change to the password would require a full re-encryption of the disk by decrypting using the key derived from the old password and re-encrypting with the key derived from the new password. To this end, the disk may be encrypted with a random disk encryption key generated from a random number generator, and a copy of the random disk encryption key is then encrypted by the key derived from the password, allowing the password to be changed by simply re-encrypting the random disk encryption key.

This approach allows for another convenience for users: a user may use the same password across multiple machines since the key derived from the user's password may be used to secure the disk encryption key on multiple systems. In this scenario, potential drawbacks arise when a user wishes to change passwords. While a password change may be a trivial operation when the user only uses one system, synchronizing a new password over multiple systems can be more involved. Two potential solutions are manually changing the password across each system, which can be inconvenient, or sending the password across the network to other systems, which poses inherent security risks. A common resolution to this problem is to generate an intermediate asymmetric key-pair which sits between the disk encryption key and the key derived from the password, typically called the user key. The key derived from the password is used to encrypt the private part of the random key unique for the user (user key), and the user public key is used to encrypt the disk encryption key. This allows for password synchronization by allowing the user private key encrypted by the key derived from the password to be shared along with the user's public key across the network without the password itself being at risk. There are other schemes that allow the user key to be securely shared across the network.

Even if data is encrypted, the potential risk of an attack on the encrypted data may be present. Encrypted data may be attacked by a method called a brute-force attack. With a brute-force attack, every possible encryption key in a given key space is tried against encrypted data (preferably against a known sector of a data) until a correct key is found. Brute force attacks can be computationally intensive and can be made even more intensive with longer encryption keys. In an effort to reduce computations, attackers may employ what is known as a dictionary attack, especially when the key derivation function is known or has been improperly retrieved from a computer. A dictionary attack exploits users' tendencies to use passwords that are relatively easy to remember, rather than ones that are completely randomized. Thus, as part of a dictionary attack, typical user passwords and various permutations of those passwords are passed through the improperly retrieved key derivation function to derive a table of potential encryption keys. Even if there are a large number of permutations of typical user passwords, the resulting list of derived encryption keys may be much smaller than a list covering the entire encryption key space. The table of derived encryption keys may then be tested on a known sector of data until the correct key is identified.

While either a brute force attack or a dictionary attack may be computationally intensive, recent computing advances have reduced and parallelized processing times. With cloud-based computing, multiple processors—which may be on the order of hundreds or thousands—connected by a network may be harnessed to simultaneously attack encrypted data. If a key derivation function is made public or is stolen from a computer, a list of dictionary passwords may be distributed amongst the processors, and a corresponding table of encryption keys may be pre-computed on the cloud. The pre-computed table of encryption keys may then be used to more quickly attack the target computer. In addition to parallelization through cloud-computing, graphics processors (e.g., a graphics processing unit called a GPU) may be used to handle the computationally intensive derivations of keys. Graphics processors are designed to be extremely effective at performing calculations and may be employed to more efficiently execute key derivation functions. While the inclusion of a different salt to the password derivation function for each user means that a table needs to be computed for each user, parallelization is still a concern.

Typical prior art methods of encrypting and synchronizing data over a network include the above described techniques. The subject matter of the present disclosure is directed to overcoming, or at least reducing the effects of, one or more of the problems set forth above. To address these and other issues, techniques that, in part, reduce the ability to parallelize attacks on encrypted data while permitting password-based information to be transmitted across a network without passing the password itself are described.

DETAILED DESCRIPTION

As explained above, there are several risks towards and avenues for potential attacks against encrypted data. Disclosed are systems and methods of employing a multi-ring encryption approach to secure a data payload. Each ring of encryption may be encrypted from a key ultimately derived from a single password, such that each subsequent ring of protection is protected by a key derived from the key used to encrypt the previous ring of protection. Further, hardware-based encryption may be employed in one or more of the rings of protection to bind the encrypted payload to the hardware. Such systems and methods may be used to reduce the ability to parallelize an attack on encrypted data while also permitting password-related data to be synchronized across a network. With reference to the figures, embodiments of encryption schemes according to this disclosure are provided below.

Figure 1:
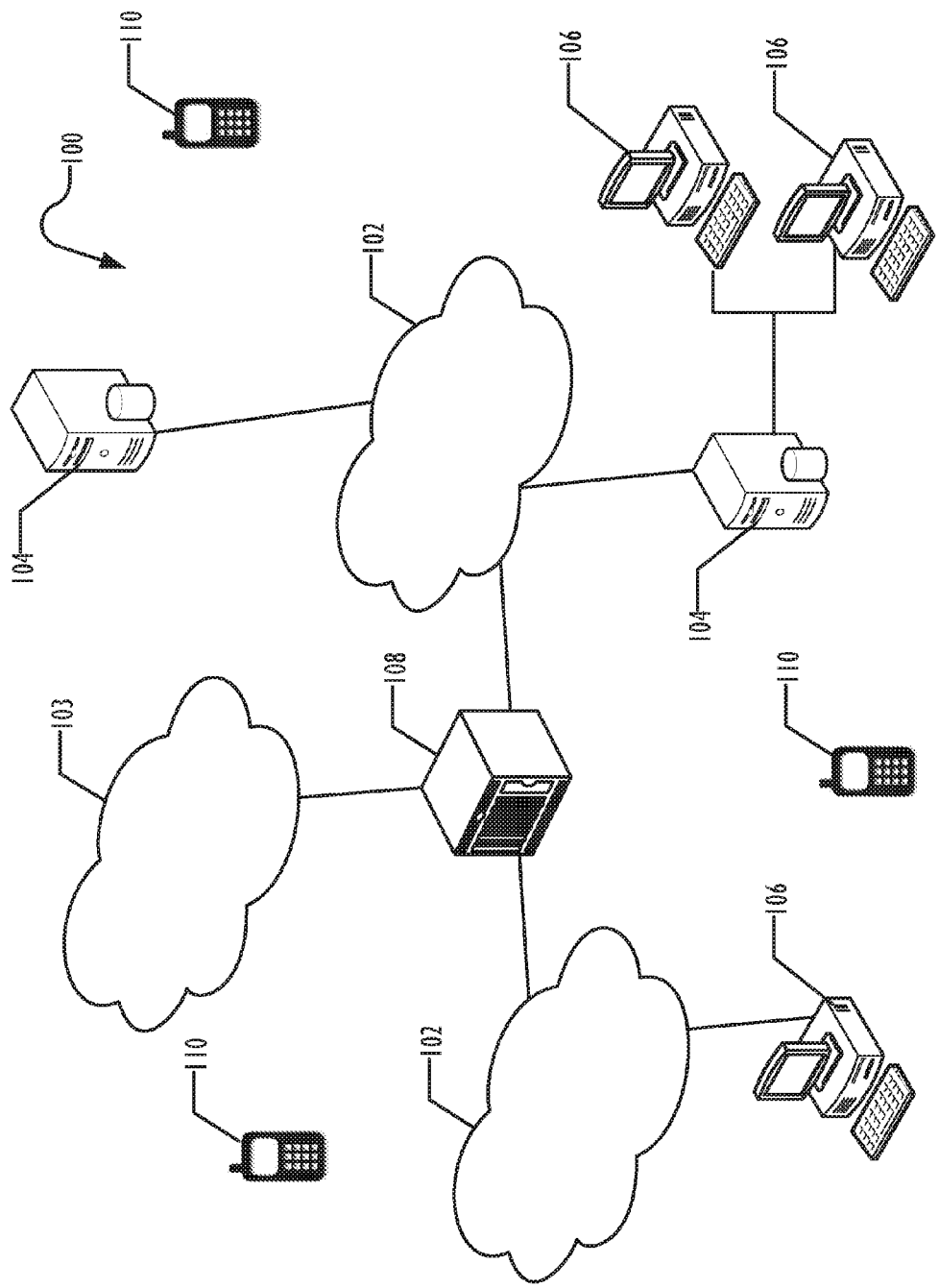
FIG. 1 is a block diagram illustrating network architecture infrastructure 100 according to one or more disclosed embodiments.

Referring now to FIG. 1, infrastructure 100 is shown schematically. Infrastructure 100 contains computer networks 102. Computer networks 102 include many different types of computer networks available today, such as the Internet, a corporate network, or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is cellular network 103 for use with mobile communication. As is known in the art, mobile cellular networks support mobile phones and many other types of devices (e.g., tablet computers not shown). Mobile devices in the infrastructure 100 are illustrated as mobile phones 110.

In a network such as that displayed in FIG. 1, encryption management software may be deployed to manage and control encryption across the devices on the network. This software could be used to manage and protect computer devices (such as personal computers, servers, laptops, tablets, mobile phones, and other similar devices), network storage solutions, removable media storage, USB devices, etc. This software may also be used to manage encryption during data transmission. As noted above, a user may have access to a number of such devices with a common login and password.

Figure 2A:
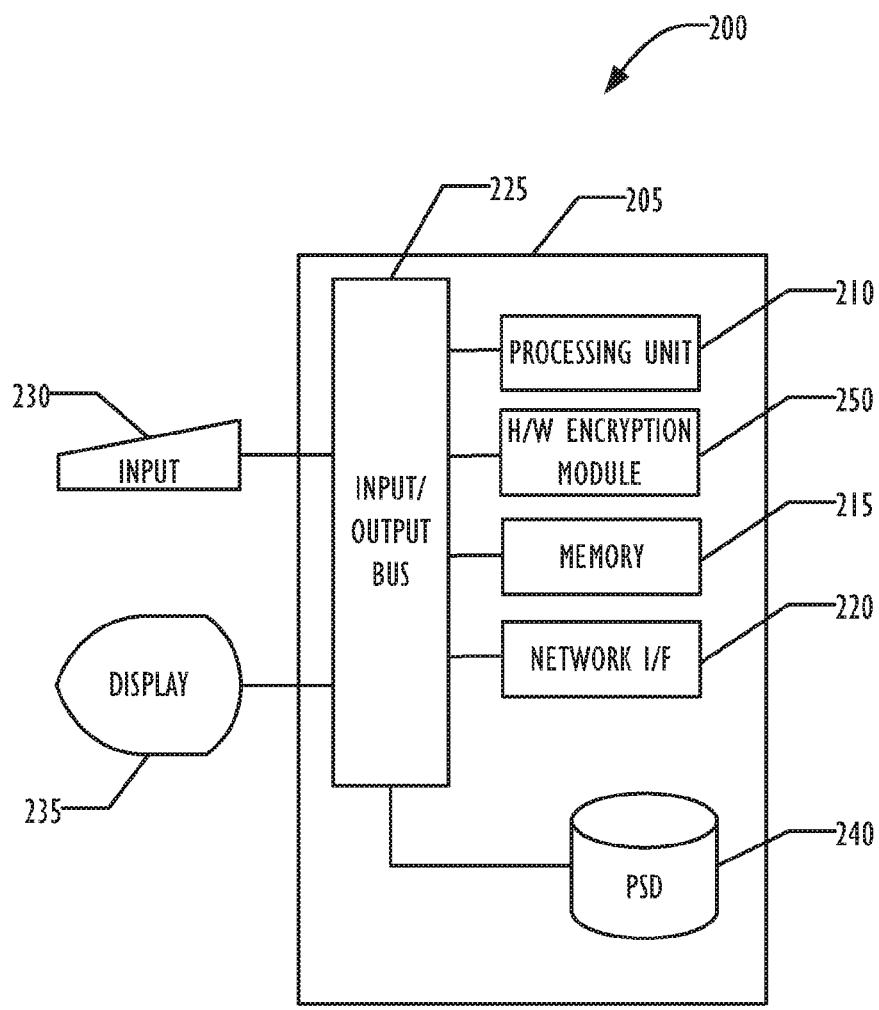
FIG. 2A is a block diagram illustrating a computer which could be used to execute the multi-ring encryption approach according to one or more of disclosed embodiments.

Referring now to FIG. 2A, an example processing device 200 for use in providing encryption techniques according to one embodiment is illustrated in block diagram form. Processing device 200 may serve as processor in a mobile phone 110, gateway or router 108, client computer 106, or a server computer 104. Example processing device 200 comprises a system unit 205 which may be optionally connected to an input device for system 230 (e.g., keyboard, mouse, touch screen, etc.) and display 235. A program storage device (PSD) 240 (sometimes referred to as a hard disk, flash memory, or computer readable medium) is included with the system unit 205. Also included with system unit 205 is a network interface 220 for communication via a network (either cellular or computer) with other computing and corporate infrastructure devices (not shown) or other mobile communication devices. Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state, storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® CORE™, PENTIUM®, and CELERON® processor families from Intel Corporation and the Cortex and ARM processor families from ARM. (INTEL, INTEL ATOM, CORE, PENTIUM, and CELERON are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory.

Figure 2B:
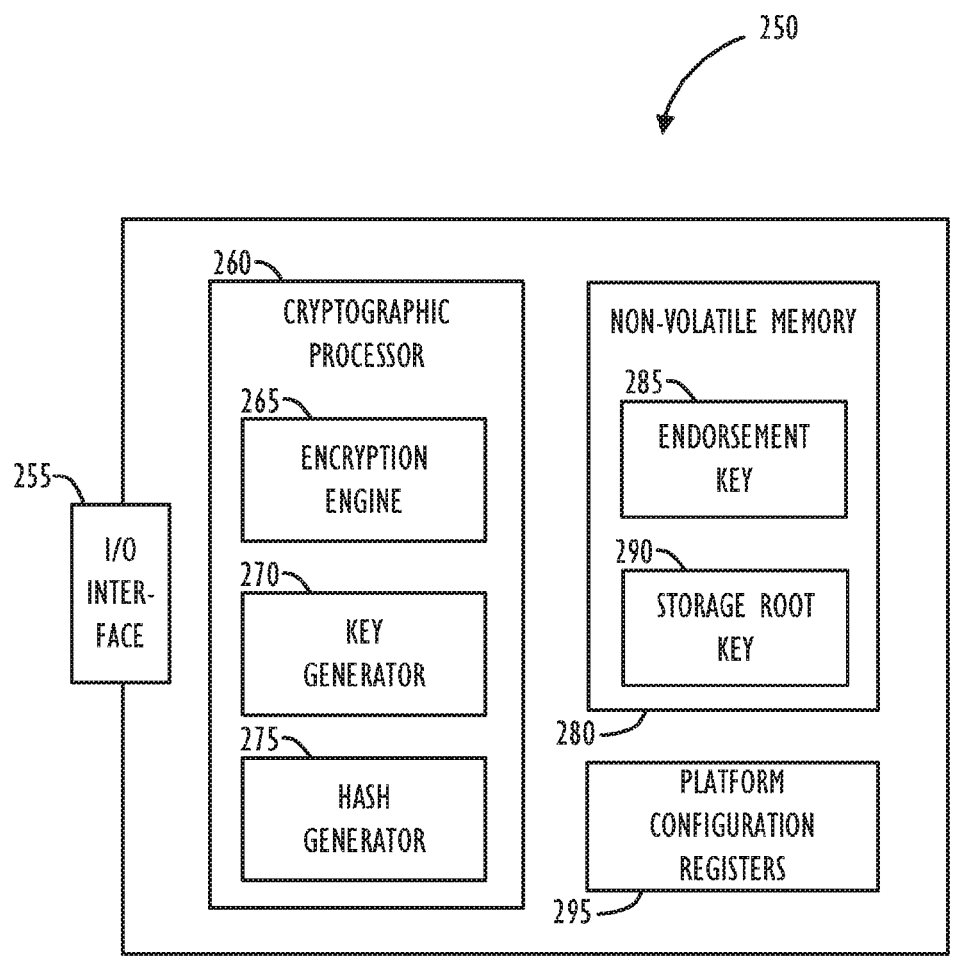
FIG. 2B is a block diagram illustrating a hardware encryption module which may reside on a computer according to one or more of disclosed embodiments.

As also shown in FIG. 2A, system unit 205 may also include a hardware encryption module 250, which may also be implemented in firmware. Referring now to FIG. 2B, hardware or firmware encryption module 250 is shown in further detail. The encryption module 250 may be, for example, a Trusted Platform Module ("TPM"). TPM is a published specification as well as a secure cryptoprocessor 260 which can store and generate cryptographic keys to use for hardware encryption. The cryptoprocessor 260 may have encryption engine 265 to encrypt data, key generator 270 to generate encryption keys, and hash generator 275 to generate hashes.

A unique and secret encryption key may be created and stored within the TPM's non-volatile memory 280 during production (i.e., chip fabrication). This key, called an endorsement key 285, is not revealed to any hardware or software external to the TPM. From the endorsement key 285, other keys may be generated. One such example is storage root key 290. Alternatively, unique and secret seeds may be created and stored within the TPM's non-volatile memory 280 during production. These seeds may be used to generate keys when the TPM is provisioned, one of which may serve as the storage root key 290. Additionally, keys may be securely exported from the TPM, securely stored externally and loaded into the TPM when required. TPM supports several features, two of which are called "binding" and "sealing." Binding encrypts data using the TPM's endorsement key 285, a key derived from that key, or some alternate secret contained within the TPM. Sealing encrypts data in a similar manner, but takes an additional step of including the state of the machine or other configuration data with the encrypted data. This is done by the TPM by incorporating policy based authorization or platform configuration information into the seal operation. Platform configuration information may be identified and stored in platform configuration registers 295. By sealing, platform configuration information is bound to the encrypted data such that the same configuration of firmware, kernel, drivers and software is needed to be able to unencrypt or access the data, depending on which PCR registers the data is sealed against. With either sealing or binding, the same TPM that was used to encrypt the data must also be used to decrypt the data. Sealing and binding both effectively prevent data from being stolen from a machine, transported to the cloud, and then being decrypted by a cloud-based attack because both require the TPM module for decryption. Sealing, however, additionally requires that the platform components to remain constant.

Additionally, during the encryption process, user authorization may also be provided to the hardware encryption module to be incorporated into the encryption process. This may be done, for example, by performing an exclusive-OR function with the authorization key and the internally stored encryption key to generate a new encryption key. Other methods may also be employed to incorporate user authorization into the encryption/decryption process, for example by creating a key in the TPM which requires authorization before it may be used. Hardware encryption module 250 may also have an input/output (I/O) interface 255 to communicate with other modules external to the hardware encryption module 250.

Processing device 200 may have resident thereon any desired operating system. Embodiments of disclosed automatic authentication techniques may be implemented using any desired programming language, and may be implemented as one or more executable programs, which may link to external libraries of executable routines that may be supplied by the provider of the detection software/firmware, the provider of the operating system, or any other desired provider of suitable library routines. As used herein, the term "a computer system" can refer to a single computer or a plurality of computers working together to perform the function described as being performed on or by a computer system. In preparation for performing disclosed embodiments on processing device 200, program instructions to configure processing device 200 to perform disclosed embodiments may be provided stored on any type of non-transitory computer-readable media, or may be downloaded from a server 104 onto program storage device 240 through network interface 220.

Encryption software may be used on processing device 200 to encrypt data stored on the device. Before the contents of encrypted data can be used, the encrypted data must be unencrypted with an encryption key. As noted above, a disk may be encrypted using a key generated by user password. However, for the disk-encryption use case, it is not practical to use a key derived from a user password to encrypt the data on the disk since a password change would require a re-encryption of the entire disk. Further, using a disk encryption key generated from an individual user's password would not be appropriate in a situation where multiple users are able to access a system, as each user may have a different password. Instead, the data on the processing device may be encrypted by a random disk encryption key. Then, a copy of the disk encryption key may be encrypted with a user key, which may be derived from an individual user's password. Accordingly, the data would not be encrypted directly by an encryption key directly derived from a user's password. In other words, a random disk encryption key can be used to encrypt the disk, a random intermediate key can be used to encrypt (and therefore protect) the disk encryption key, and finally, a hashed password can be used to encrypt (and therefore protect) the intermediate key. Changing a password therefore requires only re-encryption of the intermediate key with the new password hash. Effectively, a user enters his or her password—sometimes at a stage before the OS kernel begins to load—to decrypt the user's copy of the encrypted disk encryption key, which then subsequently decrypts the data stored on the processing device 200. This also permits one user to change his or her password without affecting the encryption of the data on the system as a whole and without affecting the passwords of other users. Further, by requiring a user to enter a password at a stage before the OS kernel begins to load, the entire disk of the computer system may be encrypted, including areas of the storage medium which store the system's operating system.

Multi-Ring Encryption Scheme

Figure 3A:
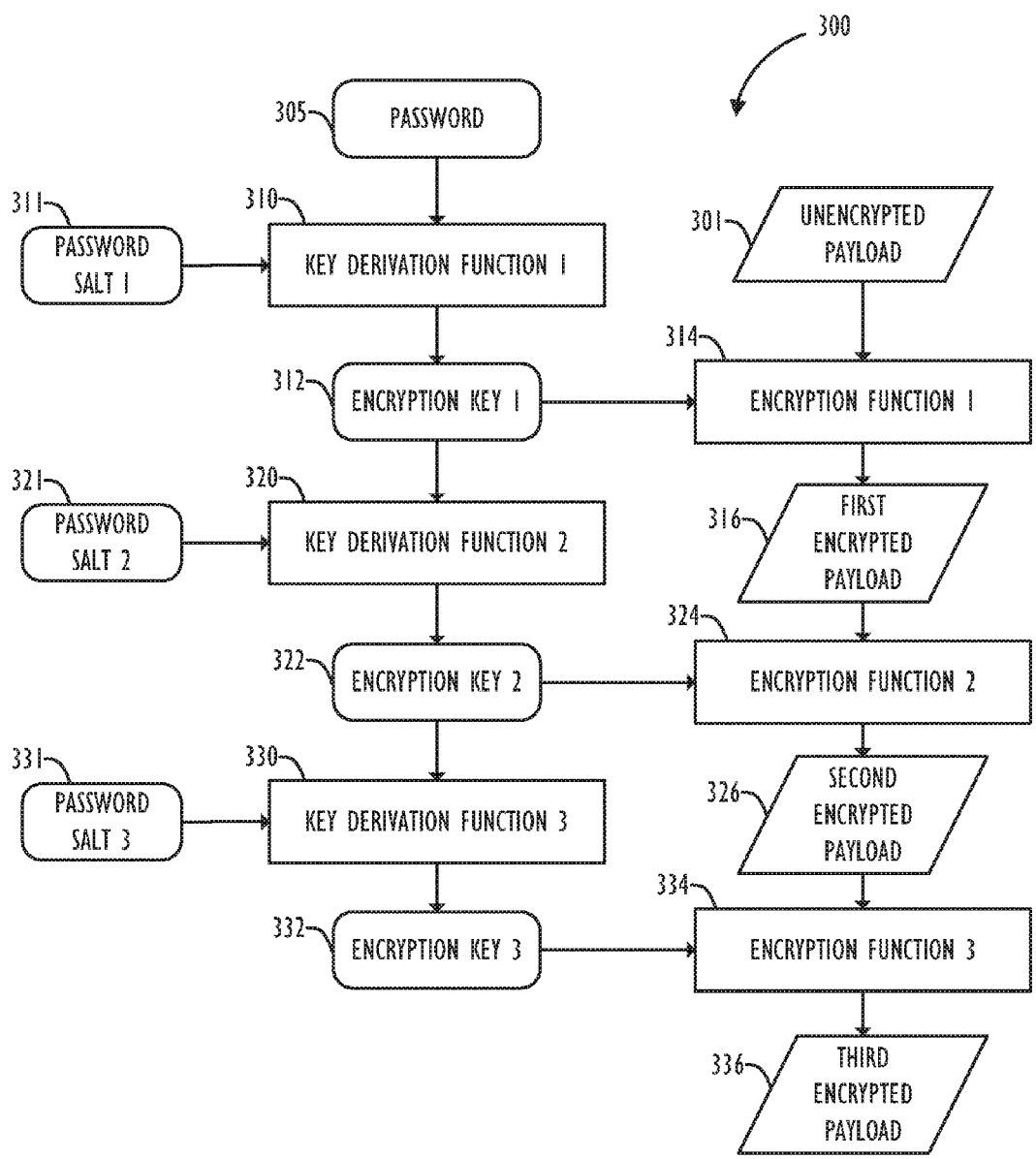
FIG. 3A is a flowchart of one embodiment of a method for a multi-ring encryption scheme utilizing multiple encryption keys derived from the same password.
Figure 3B:
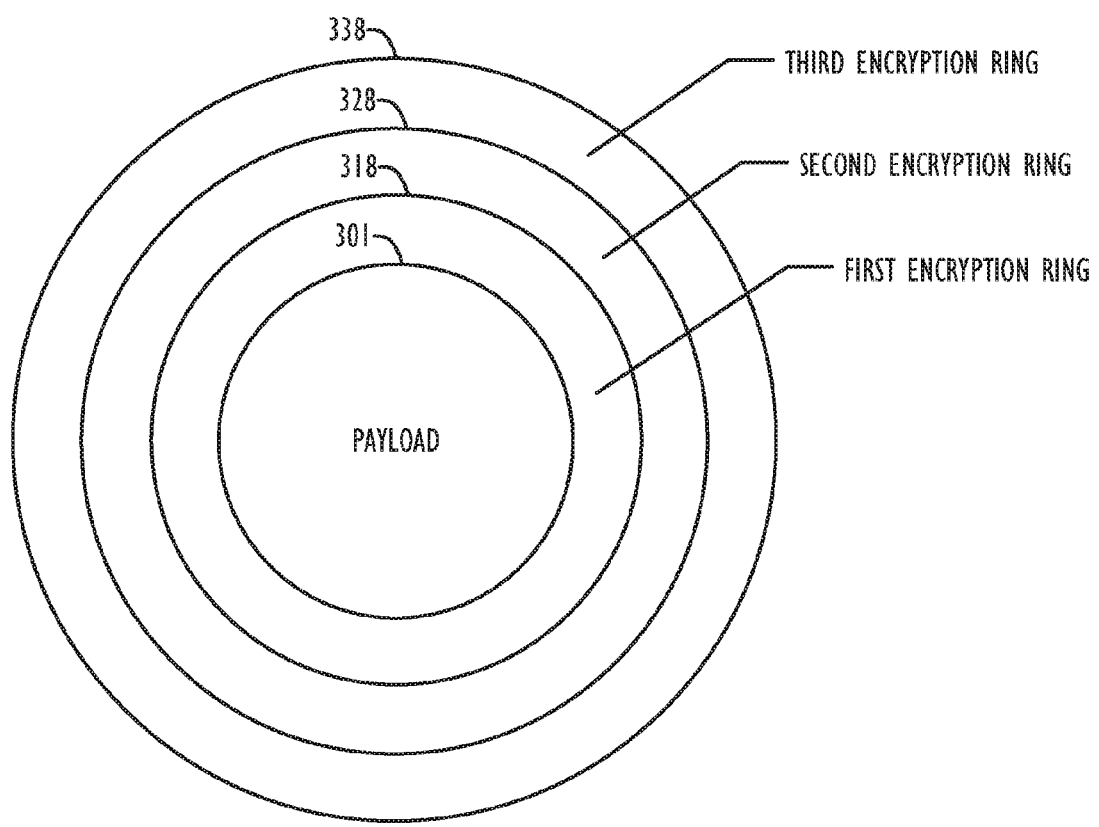
FIG. 3B shows a symbolic representation of a payload protected by the multi-ring encryption embodiment shown in FIG. 3A.

FIGS. 3A and 3B show one embodiment of a basic multi-ring encryption scheme. Referring now to FIG. 3A, flowchart 300 is shown in which a payload 301 is encrypted using multiple iterations of encryption. A user first establishes or changes a password 305. From that password 305, first key derivation function 310 is used to arrive at first encryption key 312. First key derivation function 310 may be a hashing algorithm, and may additionally incorporate the inclusion of first password salt 311 into the hashing algorithm. A password salt may be a sequence of bits that is incorporated into a user password to add an additional element of randomness to the password and prevent the same password being used by multiple users resulting in the same hash. First encryption key 312 may be used by first encryption function 314 to encrypt payload 301 for the first iteration, resulting in first encrypted payload 316. First encryption key 312 may also be passed through a second key derivation function 320, with second password salt 321, to create second encryption key 322. Second encryption key 322 may then be used by second encryption function 324 to encrypt first encrypted payload 316 for the second iteration, resulting in second encrypted payload 326. Accordingly, second encrypted payload 326 has been encrypted twice, each time with a different encryption key. At this point, second encryption key 322 may also be passed through a third key derivation function 330, with third password salt 331, to create third encryption key 332. Third encryption key 332 may then be used by third encryption function 334 to encrypt second encrypted payload 326 for the third iteration, resulting in third encrypted payload 336. It will be understood that this process may continue for a greater number or a fewer number of encryption iterations.

In an embodiment, either or both key derivation functions may be an asymmetric encryption algorithm where the private (decryption) key is destroyed. In an embodiment, first encryption key 312 could be passed as the input to second encryption function 324. In this case, each payload is encrypted only once, but the key used to protect this payload is passed into another encryption function to protect it.

As shown in FIG. 3A, three encryption keys (first encryption key 312, second encryption key 322, and third encryption key 332) may all be generated from one user password. More specifically, after the first iteration of encryption, each subsequent iteration of encryption is secured by a key derived from the key that secured the previous iteration of encryption. The payload 301 also goes through three separate encryption iterations, each with a different encryption key. The encryption functions 314, 324, and 334 may be different or the same. In other words, encryption functions 314, 324, and 334 may all be based on the same encryption algorithm, or method—where the only difference is that there are different encryption keys. Encryption functions 314, 324, and 334 may be different as well, where each function utilizes a different encryption algorithm. An approach where the encryption algorithms were different, or where password salts 311, 321, and 331 were used, would add an extra element of complexity in requiring the management of the encryption algorithms as well as the encryption keys.

FIG. 3B shows a symbolic representation of the payload after passing through the encryption processes demonstrated in FIG. 3A. Each iteration of encryption is represented as a ring around the payload 301. The data payload 301 is shown at the center of the multi-ring diagram. When payload 301 is encrypted by the first iteration of encryption (i.e., by being passed through first encryption function 314), the resulting first encrypted payload 316 may be represented as first encryption ring 318. First encryption ring 318 may be used to show that payload 301 is protected by a single layer of protection. After encrypted payload 316 is encrypted by the second iteration of encryption (i.e., by being passed through second encryption function 324), the resulting second encrypted payload 326 may be represented as second encryption ring 328, effectively a second layer of protection around payload 301. Finally, second encrypted payload 326 may be encrypted by a third iteration of encryption (i.e., by being passed through third encryption function 334), and the resulting third encrypted payload 336 may be represented as third encryption ring 338, which effectively is a third layer of protection around payload 301. Accordingly, the different iterations of encryption may be represented as layers, or rings, of protection around payload 301, as shown in FIG. 3B.

Further, any subsequent iterations of encryption beyond what is shown in FIG. 3B may be represented by subsequent layers, or rings, around payload 301. It also will be understood that the layers of protection around the payload 301 in FIG. 3B do not necessarily expand the payload's size because encryption typically does not expand the size of the data being encrypted, with one notable exception from the use of padding bytes.

In another embodiment, it is not necessary that each key is specifically derived from the previous key. Instead, the multi-ring encryption may be performed using two or more keys that are first derivatives of the user password, or two or more keys that are second derivatives of the user password, etc. This may be performed, for example, by utilizing different key derivation functions all at the same level. Further, any such combination of first or second (or greater) derivatives of the user password may be used. As mentioned above, any number of iterations, or rings, of encryption may be employed.

Figure 4A:
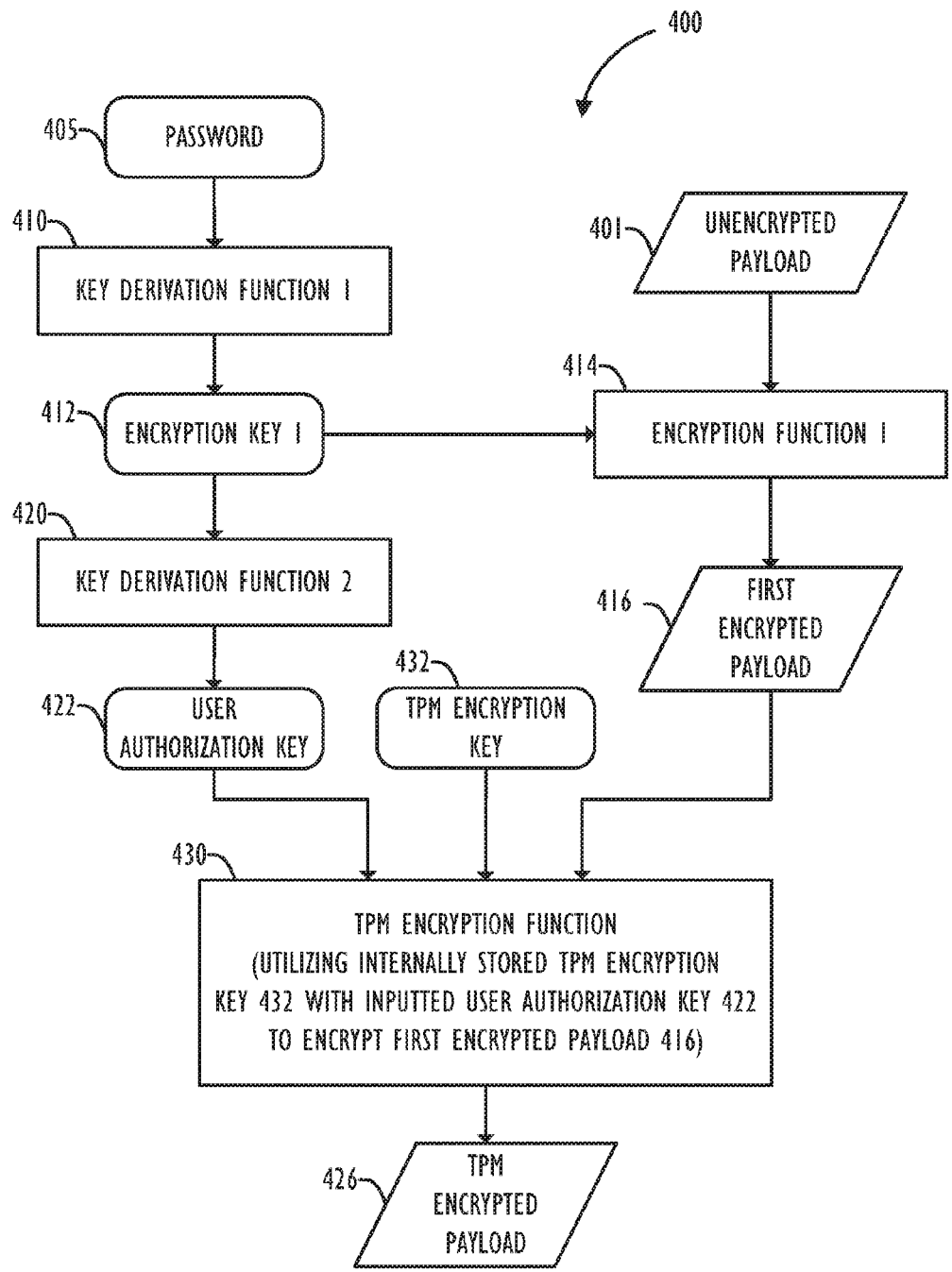
FIG. 4A is a flowchart of another embodiment of a method for a multi-ring encryption scheme utilizing a hardware encryption module.

FIG. 4A shows a flowchart 400 illustrating initializing encryption utilizing a hardware or firmware encryption module when a password is changed or initially established. More specifically, FIG. 4A demonstrates the usage of an authorization key derived from a user password used to authorize a hardware-based encryption of a payload. In the embodiment shown in FIG. 4A, TPM is used as the hardware encryption module for the payload. After the system receives the password, first key derivation function 410 generates first encryption key 412. As shown with FIG. 3A, a password salt may be incorporated into each key derivation function. Returning to FIG. 4A, the first encryption key 412 is passed to first encryption function 414, which encrypts payload 401 to create first encrypted payload 416. Meanwhile, first encryption key 412 is passed through second key derivation function 420 to create a user authorization key 422. The user authorization key 422 is provided to a hardware encryption module, such as a TPM module, along with the first encrypted payload 416.

At 430, the TPM module, or other hardware encryption module, then encrypts the first encrypted payload 416. To do this, the TPM module may utilize both the externally generated user authorization key 422 as well as a TPM encryption key 432 stored within the TPM module. As noted above, the TPM encryption key 432 that may be stored within the TPM module may be the endorsement key, or another key that has been generated by the TPM module. Alternatively, TPM encryption key 432 may be loaded into the TPM from external storage before use. The externally generated user authorization key 422 will be passed as input into the TPM module. The TPM encrypted payload 426 can be derived in this manner. Further, if the TPM module has performed a sealing or binding operation, then the TPM encrypted payload 426 would be effectively bound to the system at which the TPM module resides. Further still, because the user authorization key 422 was ultimately generated from a user-inputted password, the TPM encrypted payload 426 has the added characteristic of requiring user input for authorization prior to decryption. Accordingly, TPM encrypted payload 426 is effectively bound to the hardware, is twice encrypted, and requires user input as part of the decryption process. Further iterations of encryption may be employed as well.

Figure 4B:
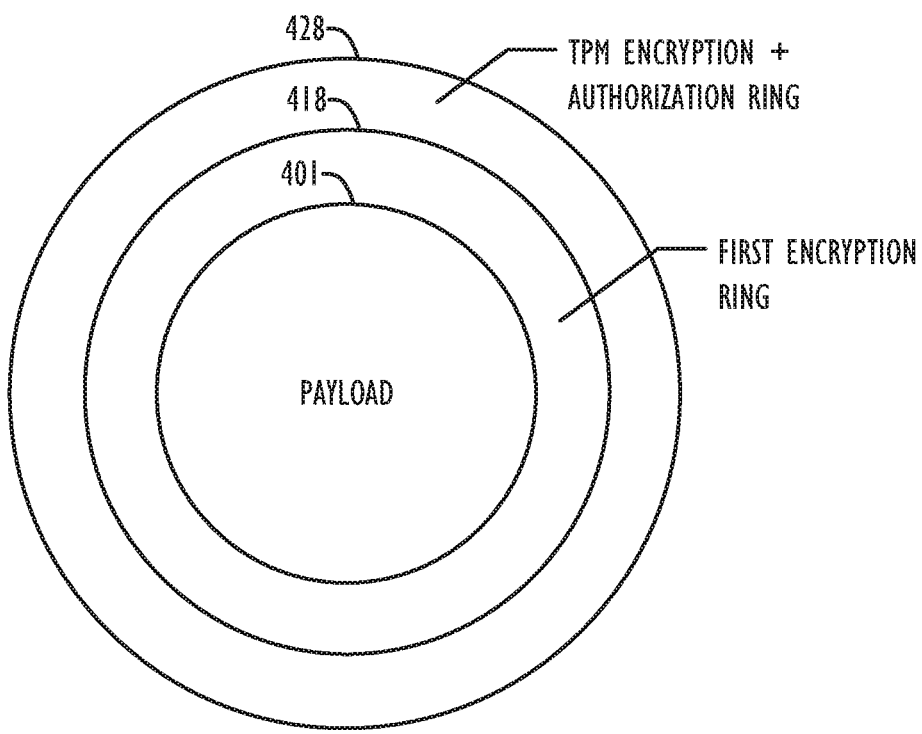
FIG. 4B shows a symbolic representation of a payload protected by the multi-ring encryption embodiment shown in FIG. 4A.

FIG. 4B shows a symbolic representation of the payload after passing through the encryption processes demonstrated in FIG. 4A. Both encryption iterations are represented as rings around the payload 401. The data payload 301 is shown at the center of the multi-ring diagram. When payload 401 is encrypted by the first iteration of encryption (i.e., by being passed through first encryption function 414), the resulting first encrypted payload 416 may be represented as first encryption ring 418, which demonstrates that payload 401 is protected by a single layer of protection. After encrypted payload 416 is encrypted by the second iteration of encryption (i.e., by being passed through TPM encryption function 430), the resulting second encrypted payload 426 may be represented as TPM encryption and authorization ring 428, which effectively is a second layer of protection around payload 401. Accordingly, the two iterations of encryption may be represented as rings, or layers, of protection around payload 401.

Network Synchronization of Password and Encrypted Data

As noted above, one issue in an enterprise, or other networked, environment is that a user who has access to multiple systems may change their password. As also discussed above, an encryption scheme may exist which requires the input of a password for decryption and authorization. In these situations, a password change made on one system may need to be communicated to other systems to which the user has access rights. This can be an inherent security risk, even if the password is never sent across the network. This situation becomes further complicated by the fact that encrypted data may also need to be transported across the network in conjunction with the password data or the password hash. However, as will be explained in further detail below, this risk may be mitigated by avoiding sending the password or password hash.

Referring back to FIG. 4A, user authorization key 422 has been derived from a password 405 after being passed through first key derivation function 410 and second key derivation function 420, wherein one or both key derivation functions may include the incorporation of a password salt. Because user authorization key 422 has passed through two functions, user authorization key 422 may be referred to as a second derivative of password 405. Assuming that each key derivation function results in a unique or almost-unique result for each potential input from the password space (i.e., there are zero to few collisions arising from the key derivation function), there is a very low probability that user authorization key 422 may be derived from any other password. User authorization key 422 is thus indicative of the password 405 but can be quite different from the password 405 and also (and importantly) different from first encryption key 412 which was used to secure the unencrypted payload 401. Consequently, user authorization key 422 may be sent across a network to another system to indicate the change in password 405 without actually sending the password 405 or first encryption key 412 itself.

Further, if data needs to also be synchronized across the network, then first encrypted payload 416 may be sent across the network along with user authorization key 422. Sending an encryption key along with encrypted data would leave the data completely vulnerable to attack, even if the key and data were further encrypted in transmission. However, by sending first encrypted payload 416 with user authorization key 422, no inherent vulnerability is exposed. The first encrypted payload 416 was encrypted by first encryption key 412. User authorization key 422 is a derivative of first encryption key 412. As noted above, key derivation functions will be one-way functions with no inverse. Even though first encryption key 412 and user authorization key 422 are both derived from password 405, possession of a later derivative of the password does not allow access to the previous input without a brute force attack—which, if the key derivation functions are computationally expensive, will be no less expensive than attacking first encrypted payload 416, and likely to be significantly more expensive than performing a dictionary attack on the first encrypted payload. Accordingly, with carefully chosen derivation functions there is no added vulnerability by deriving first encryption key 412 from an interception of user authorization key 422. For the same reasons described above, interception of user authorization key 422 also does not pose an inherent threat to revealing password 405, providing that key derivation functions are carefully chosen.

Furthermore, because user authorization key 422 is not directly used as the encryption key for encryption function 430 to arrive at hardware encrypted payload 426, possession of user authorization key 422 does not expose hardware encrypted payload 426 to risk. As noted above, hardware encrypted payload 426 is encrypted using the combination of an encryption key internal to the hardware encryption module (i.e., TPM encryption key 432) and user authorization key 422. Accordingly, both keys are necessary for decryption as well. Because the TPM encryption key 432 is stored internally to the TPM module, and is not exposed externally, there is little risk that the interception of user authorization key 422 would render vulnerable either TPM encryption key 432 or TPM encrypted payload 426 on the system, unless an attacker had also physically stolen the system on which the TPM module and encrypted data resided.

Additionally, because first encrypted payload 416 has already been encrypted, payload 401 is not vulnerable. Further, interception of first encrypted payload 416 would also not render vulnerable TPM encrypted payload 426. Accordingly, user authorization key 422 and first encrypted payload 416 may be sent across a network without unnecessarily exposing any of: the underlying data (such as payload 401 and password 405), the encryption keys (such as first encryption key 412 or TPM encryption key 432), or the final encrypted data (such as TPM encrypted payload 426), providing that the user authorization key 422 is not stored anywhere in the network, is only generated on demand, and is destroyed immediately after it has been passed to the TPM as authorization.

Figure 4C:
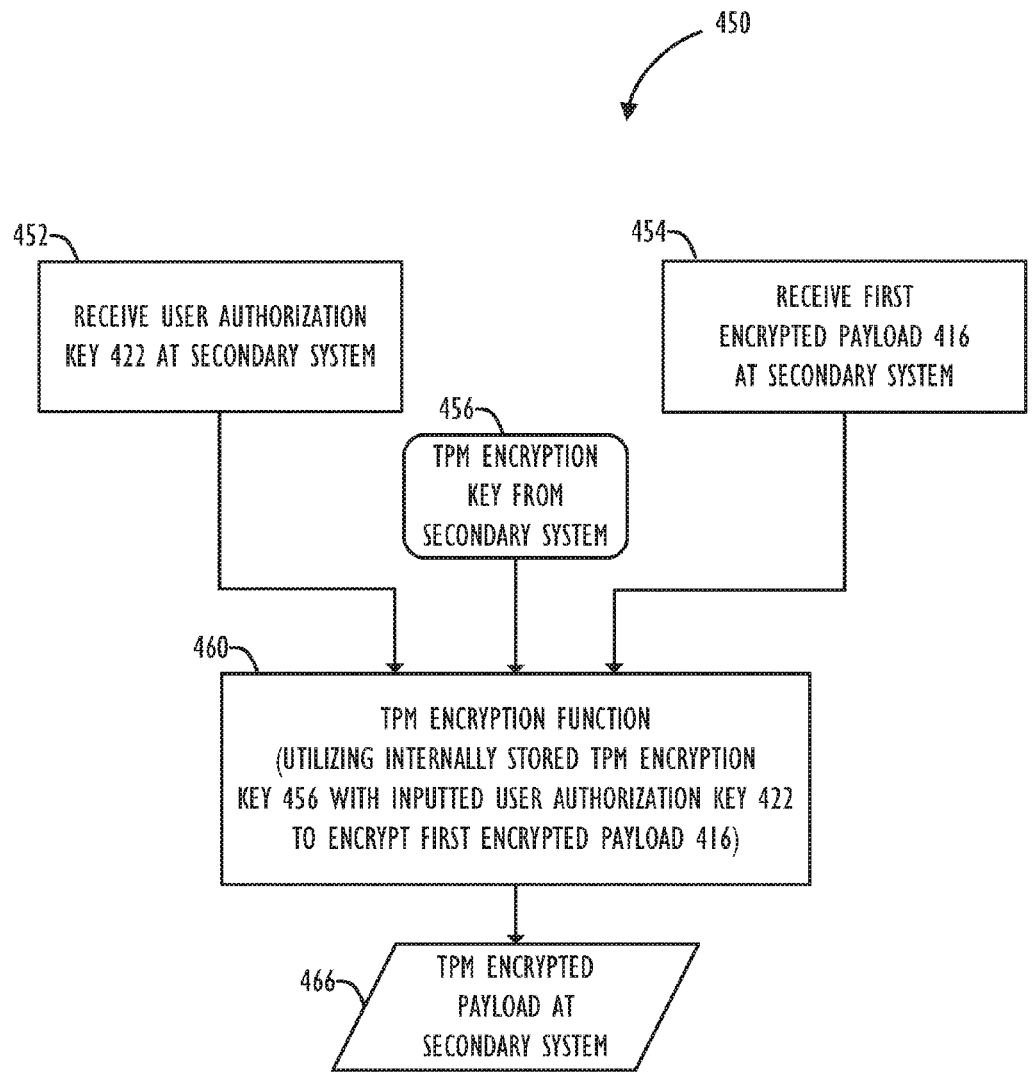
FIG. 4C is a flowchart of an embodiment of a method to synchronize password-based information and encrypted data derived from a multi-ring encryption scheme across a network.

Referring now to FIG. 4C, flowchart 450 is shown for receiving the encryption data at a system different from that where the password was changed. Although the secondary system does not ever receive the password 405 directly, the secondary system receives the user authorization key 422 (at 452 in FIG. 4C), which is derived from the password 405. Further, the secondary system also receives first encrypted payload 416 (at 454 in FIG. 4C). Neither of user authorization key 422 or first encrypted payload 416 are stored in permanent storage on the system but should reside only in volatile memory. After both sets of data have been received by the secondary system, the hardware encryption module of the secondary system may utilize its own hardware encryption key 456, in combination with user authorization key 422, to encrypt first encrypted payload 416. This results in a hardware encrypted payload 466 at the secondary system. Further, as noted above, if the sealing/binding function of the encryption module is used, the hardware/firmware encrypted payload 466 is tied to the secondary system. In this manner, any secondary system may receive information about a user's password change, receive data associated with this password change without actually receiving the password, and encrypt and bind or seal associated data at the system utilizing the user authorization information and a hardware encryption key 456 unique to the hardware encryption module of the secondary system. After the hardware encrypted payload 466 has been generated at the secondary system, the user authorization key 422 and the first encryption payload 416 may be deleted from the secondary system's volatile memory, leaving the system secure.

Figure 5:
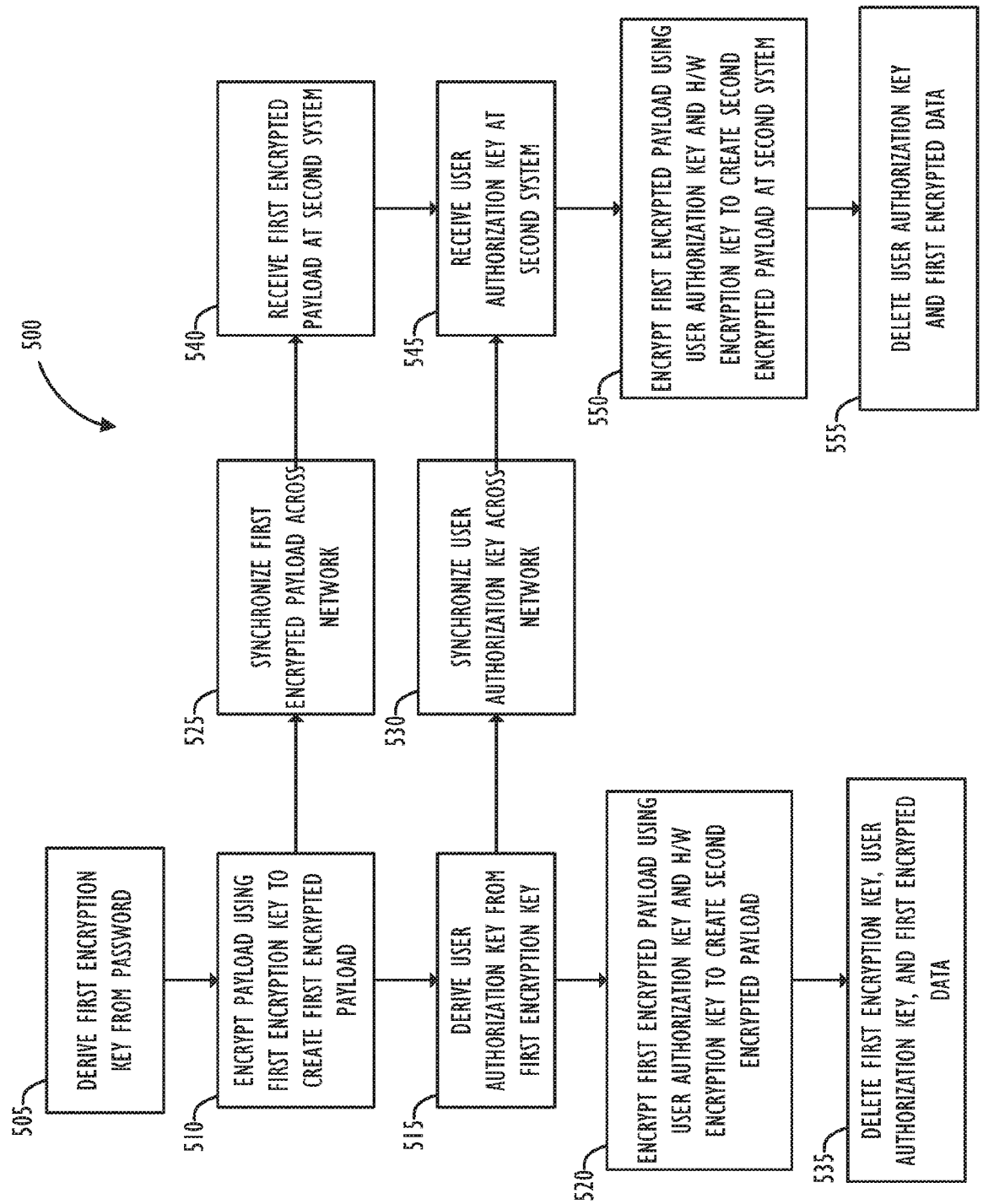
FIG. 5 illustrates a method that summarizes the initialization of encryption based on a password at one system and synchronization at a second system.

FIG. 5 shows a method 500 that summarizes the synchronization across the different systems as described above. Elements 505, 510, 515, and 520 may occur at a first computer system. At 505, a first encryption key may be derived from a password. At 510, a payload may be encrypted using the first encryption key to create a first encrypted payload. At 515, a user authorization key may be derived from the first encryption key, and, at 520, the first encrypted payload may be encrypted using the user authorization key and the hardware encryption key (i.e., from the hardware encryption module) to create second encrypted payload. This summarizes what may occur at the first computer system, similar to what was described in greater detail with respect to FIG. 4A. Only second encrypted payload should be stored to permanent storage.

Continuing with method 500 of FIG. 5, at 525, the first encrypted payload from the first computer system may be synchronized across a network. Similarly, at 530, the user authorization key from the first computer system may be synchronized across a network. After the transmissions, the user authorization key and the first encrypted payload may be deleted from the first computer system, while the first encryption key may be deleted after the first encryption payload is created (at 510). At 540 and 545, respectively, the first encrypted payload and the user authorization key are received at a second computer system, but not stored in permanent storage on the system. Because the second computer system does not have the first encryption key, it cannot decrypt the first encrypted payload at this time. However since the second system does have the user authorization key, as shown at 550, the second computer system may further encrypt the first encrypted payload to create a second encrypted payload on the second computer system. Because the hardware encryption modules on the two computer systems will be different from each other, the two systems may generate two different hardware encryption keys, and the resulting second encrypted payload on each system will be different. In this manner, the second encrypted payload can be tied to the computer system. At 555, the user authorization key and the first encrypted data on the second computer system may be deleted. These elements summarize what may occur at the second computer system, described in greater detail with respect to FIG. 4C.

Decryption of Data Encrypted Using a Multi-Ring Encryption Scheme

Figure 4D:
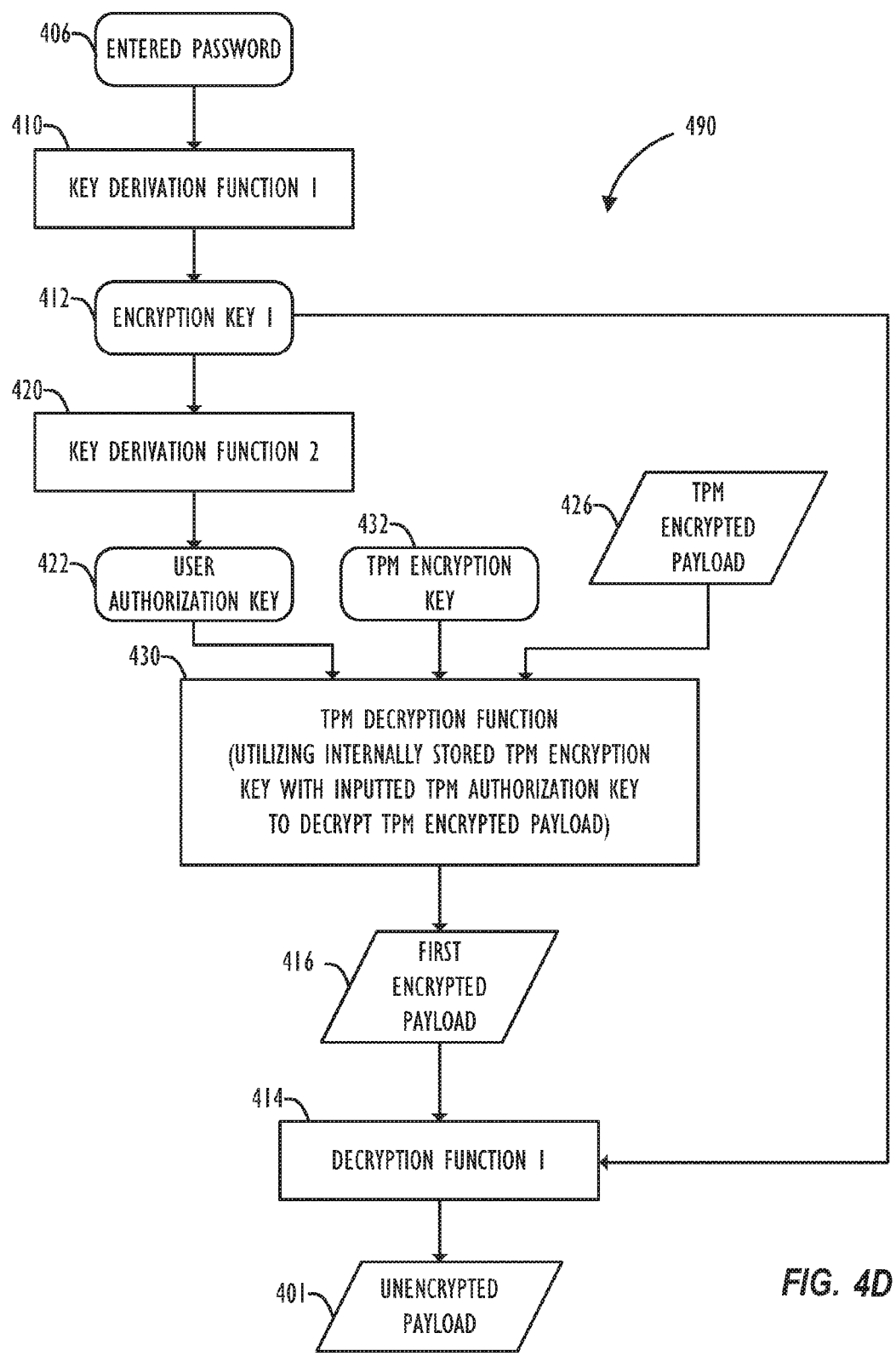
FIG. 4D is a flowchart of an embodiment of a method to decrypt data encrypted using a multi-ring encryption scheme.

FIG. 4D shows a flowchart 490 of decrypting a hardware encrypted payload 432 that was encrypted using a multi-ring encryption scheme. At 406, a password may be entered by a user and received in the system. After the system receives the password, the password 406 can be entered into first key derivation function 410, which generates first encryption/decryption key 412. First encryption/decryption key 412 can be passed through second key derivation function 420 to generate user authorization key 422. The user authorization key 422 can be provided to a hardware encryption module, such as a TPM module, along with the hardware encrypted payload 426. At 430, the TPM module, or other hardware encryption module, then can decrypt the hardware encrypted payload 426 using the internally stored hardware encryption key 432 and the generated user authorization key 422. Obviously, if the user has entered an incorrect password 406, then the second derivative user authorization key 422 generated from it will not be correct. Accordingly, the hardware decryption at 430 will fail to decrypt hardware encrypted payload 426. A correctly entered password 406, however, will result in successful decryption of hardware encrypted payload 426 and result in first encrypted payload 416. Referring briefly to FIG. 4B, a successful decryption of hardware encrypted payload 426 can be symbolically represented as removing hardware encryption and authorization ring 428 from the encrypted payload, leaving only first encryption ring 418 as surrounding the payload 401.

Returning to FIG. 4D, the first encrypted payload 416 is passed through first decryption function 414, along with first encryption key 412, which was earlier derived from the inputted password 406. As with the earlier decryption iteration, an incorrect password 406 will result in an incorrectly derived first encryption key 412, which would result in a failed attempt at decryption. A correct password 406 will result in the correct generation of first encryption key 412, which would be able to successfully decrypt first encrypted payload 416, which would result in decrypted payload 401 being outputted from decryption function 414. In FIG. 4B, a successful decryption would result in the removal of first encryption ring 418, leaving only payload 401.

This same method could be followed either at the original location at which the user password was initiated/changed (as shown in FIG. 4A), or the location at which the encryption data and password-related data was synchronized (as shown in FIG. 4C). Each respective system would use its own hardware or firmware encryption module to perform part of the decryption process.

EXAMPLES

The following examples pertain to further embodiments. In a first embodiment, a non-transitory computer readable medium comprises computer executable instructions stored thereon to cause one or more processing units to receive a new password, derive a first encryption key using a first key derivation function from the new password, encrypt a payload using the first encryption key to create a first encrypted payload, derive a second encryption key using a second key derivation function from the first encryption key, and encrypt the first encrypted payload using the second encryption key to create a second encrypted payload.

In the above example, further instructions may cause the processing units to derive a third encryption key using a third key derivation function from the second encryption key, and encrypt the second encrypted payload using the third encryption key to create a third encrypted payload. In the above examples, the second encryption key may optionally be an authorization key for a hardware or firmware encryption module. In the previous example, the hardware or firmware encryption module may be a trusted platform module communicatively coupled to the one or more processing units. In another example, the instructions to encrypt the first encrypted payload using the second encryption key to create a second encrypted payload comprise instructions to encrypt the first encrypted payload using the second encryption key and a hardware encryption key to create a second encrypted payload. In any of the above examples, the first key derivation function may comprise a hashing function. In the previous example, the hashing function may further include a password salt. In the above examples, the first key derivation function may comprise an encryption function. In the above examples, further instructions may cause the one or more processing units to transmit the second encryption key across a network, and transmit the first encrypted payload across the network. In the above examples, the trusted platform module additionally may use an internal trusted platform module encryption key.

In another embodiment, a non-transitory computer readable medium comprises computer executable instructions stored thereon to cause one or more processing units to receive a password input, derive a first encryption key using a first key derivation function from the password input, derive a second encryption key using a second key derivation function from the first encryption key, decrypt a second encrypted payload using the second encryption key to arrive at a first encrypted payload, and decrypt the first encrypted payload using the first encryption key to arrive at an unencrypted payload. In the above example, the second encryption key may be an authorization key for a hardware or firmware encryption module, and the hardware or firmware encryption module may decrypt the second encrypted payload.

In another example, a method of synchronizing a password to decrypt an encrypted payload comprises receiving a second encryption key at a computer system, where the second encryption key is a derivative of a first encryption key, receiving a first encrypted payload at the computer system, where the first encrypted payload was previously encrypted using the first encryption key, where the first encryption key is a derivative of a user password, and where the first encrypted payload is not able to be decrypted by the computer system without the user password, encrypting the first encrypted payload using the second encryption key to create a second encrypted payload, receiving the user password at the computer system, deriving a first decryption key from the user password using a first key derivation function, deriving a second decryption key from the first encryption key using a second key derivation function, decrypting the second encrypted payload using the second encryption key to create the first encrypted payload, and decrypting the first encrypted payload using the first encryption key to create an unencrypted payload.

In the above example, the first encrypted payload and the second encryption key may be deleted from the computer system after the second encrypted payload is created. In the above examples, the first encryption key may equal the first decryption key and the second encryption key equals the second decryption key. In the above examples, the second encryption key may be an authorization key for a hardware or firmware encryption module, and the hardware or firmware encryption module may perform the acts of encrypting the first encrypted payload and decrypting the second encrypted payload. In the above examples, the hardware or firmware encryption module may additionally use an internal encryption key. In the above examples, any of the key derivation functions may use a password salt. In the above examples, the methods may additionally comprise transmitting the second encryption key across a network, and transmitting the first encrypted payload across the network. In the above examples, the key derivation functions may comprise hashing functions or encryption functions.

In another embodiment, a method of encrypting a payload comprises receiving a new password, deriving a first encryption key using a first key derivation function from the new password, encrypting a payload using the first encryption key to create a first encrypted payload, deriving a second encryption key using a second key derivation function from the first encryption key, and encrypting the first encrypted payload using the second encryption key to create a second encrypted payload. In the above example, the method may further comprise deriving a third encryption key, using a third key derivation function, from the second encryption key, and encrypting the second encrypted payload using the third encryption key to create a third encrypted payload. In the above examples, encrypting the first encrypted payload using the second encryption key to create a second encrypted payload may be performed by a hardware or firmware encryption module.

In another example, a system that is encrypted to encrypt a payload comprises a memory and one or more processing units that are communicatively coupled to the memory. The one or more processing units of the system may be configured to execute instructions stored in memory to perform any of the methods or execute any of the instructions stored on a computer readable medium described in the examples above. In another example, the instructions to encrypt the first encrypted payload using the second encryption key to create a second encrypted payload may comprise instructions to encrypt the first encrypted payload using the second encryption key and a hardware encryption key to create a second encrypted payload. In the above examples, the first key derivation function may comprise a hashing function. Specifics in the examples and embodiments above may be used anywhere in one or more embodiments.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer readable code which, when executed by a processor, causes the processor to:
   receive, from a first computer system, a first encrypted payload at a second computer system;
   receive, from the first computer system, a user authorization key, wherein the user authorization key is derived from a first encryption key using a key derivation function, wherein the first encryption key is derived from a user password, wherein the encrypted payload is encrypted by the first encryption key, wherein the first encryption key does not include the user password, and wherein the user authorization key is different than the encryption key;

store the first encrypted payload and the user authorization key in the second computer system;

encrypt, by a hardware encryption module of the second computer system, the first encrypted payload using the received user authorization key and a hardware encryption key associated with the second computer system to generate a second encrypted payload, wherein the hardware encryption module comprises a trusted hardware environment; and in response to generating the second encrypted payload, remove the first encrypted payload and the user authorization key from the second computer system.

2. The non-transitory computer readable medium of claim 1, wherein the user authorization key is stored in a volatile memory of the second computer system, and wherein the user authorization key is removed from the volatile memory of the second computer system.

3. The non-transitory computer readable medium of claim 1, wherein the hardware encryption module comprises a trusted platform module.

4. The non-transitory computer readable medium of claim 3, wherein the hardware encryption module comprises a cryptographic processor.

5. The non-transitory computer readable medium of claim 1, further comprising instructions which cause the machine to:
receive a request to decrypt the encrypted payload;
receive, at the second device, the user password by a user interface;
derive the first encryption key from the user password;
generate the user authorization key from the first encryption key; and
decrypt, by the hardware encryption module, the encrypted payload using the user authorization key.

6. The non-transitory computer readable medium of claim 5, wherein the user password is previously unknown to the second device.

7. A system for password synchronization, comprising:
a processor;
a memory communicably coupled to the processor and comprising computer readable code which, when executed by the processor, causes the processor to:
receive, from a first computer system, a first encrypted payload at a second computer system,
receive, from the first computer system, a user authorization key, wherein the user authorization key is derived from a first encryption key using a key derivation function, wherein the first encryption key is derived from a user password, wherein the encrypted payload is encrypted by the first encryption key, wherein the first encryption key does not include the user password, and wherein the user authorization key is different than the encryption key, and wherein the user authorization key is different than the encryption key,
store the first encrypted payload and the user authorization key in the second computer system; and
a hardware encryption module configured to:
encrypt the first encrypted payload using the received user authorization key and a hardware encryption key associated with the second computer system to generate a second encrypted payload;
wherein, in response to generating the second encrypted payload, the first encrypted payload and the user authorization key are removed from the second computer system, and
wherein the hardware encryption module comprises a trusted hardware environment.

8. The system of claim 7, wherein the user authorization key is stored in a volatile memory of the second computer system, and wherein the user authorization key is removed from the volatile memory of the second computer system.

9. The system of claim 7, wherein the hardware encryption module comprises a trusted platform module.

10. The system of claim 9, wherein the hardware encryption module comprises a cryptographic processor.

11. The system of claim 7, the memory further comprising instructions which cause the machine to:
receive a request to decrypt the encrypted payload;
receive, at the second device, the user password by a user interface;
derive the first encryption key from the user password;
generate the user authorization key from the first encryption key; and
decrypt, by the hardware encryption module, the encrypted payload using the user authorization key.

12. The system of claim 11, wherein the user password is previously unknown to the second device.

13. A method for password synchronization, comprising:
receiving, from a first computer system, a first encrypted payload at a second computer system;
receiving, from the first computer system, a user authorization key, wherein the user authorization key is derived from a first encryption key, wherein the first encryption key is derived from a user password, wherein the encrypted payload is encrypted by the first encryption key, and wherein the first encryption key does not include the user password, wherein the first encryption key does not include the user password, and wherein the user authorization key is different than the encryption key;
storing the first encrypted payload and the user authorization key in the second computer system;
encrypting, by a hardware encryption module of the second computer system, the first encrypted payload using the received user authorization key and a hardware encryption key associated with the second computer system to generate a second encrypted payload, wherein the hardware encryption module comprises a trusted hardware environment; and
in response to generating the second encrypted payload, removing the first encrypted payload and the user authorization key from the second computer system.

14. The method of claim 13, wherein the user authorization key is stored in a volatile memory of the second computer system, and wherein the user authorization key is removed from the volatile memory of the second computer system.

15. The method of claim 13, wherein the hardware encryption module comprises a trusted platform module.

16. The method of claim 15, wherein the hardware encryption module comprises a cryptographic processor.

17. The method of claim 13, further comprising:
receiving a request to decrypt the encrypted payload;
receiving, at the second device, the user password by a user interface;

deriving the first encryption key from the user password;
generating the user authorization key from the first encryption key; and
decrypting, by the hardware encryption module, the encrypted payload using the user authorization key.

18. The method of claim 17, wherein the user password is previously unknown to the second device.

* * * * *